(12) United States Patent
Marshall et al.

(10) Patent No.: US 11,061,104 B2
(45) Date of Patent: Jul. 13, 2021

(54) METHOD AND APPARATUS FOR POSITIONING WITH WIRELESS SIGNALS

(71) Applicant: u-blox AG, Thalwil (CH)

(72) Inventors: Christopher Brian Marshall, Haywards Heath (GB); Giacomo Pojani, Bologna (IT); Fabio Ricciato, Trieste (IT); Matija Rezar, Kranj (SI); Erik Štrumbelj, Kocevje (SI)

(73) Assignee: U-BLOX AG, Thalwil (CH)

( * ) Notice: Subject to any disclaimer, the term of this patent is extended or adjusted under 35 U.S.C. 154(b) by 237 days.

(21) Appl. No.: 16/422,931

(22) Filed: May 24, 2019

(65) Prior Publication Data

US 2020/0371193 A1    Nov. 26, 2020

(51) Int. Cl.
*G01S 5/10*  (2006.01)
*G01S 3/46*  (2006.01)
*G01S 5/02*  (2010.01)
*G01S 5/14*  (2006.01)

(52) U.S. Cl.
CPC ............... *G01S 5/10* (2013.01); *G01S 3/46* (2013.01); *G01S 5/0221* (2013.01); *G01S 5/14* (2013.01)

(58) Field of Classification Search
CPC .......... G01S 5/02; G01S 5/021; G01S 5/0252; G01S 5/0221; G01S 5/14; G01S 3/46; H04W 64/00
USPC .......................................................... 342/451
See application file for complete search history.

(56) References Cited

U.S. PATENT DOCUMENTS

| 8,063,825 | B1 * | 11/2011 | Yang | G01S 5/009 |
| | | | | 342/458 |
| 9,213,083 | B1 * | 12/2015 | Carter | G01S 5/0226 |
| 2010/0279707 | A1 * | 11/2010 | Fischer | G01S 5/14 |
| | | | | 455/456.1 |

(Continued)

FOREIGN PATENT DOCUMENTS

EP    2 634 593 A1    9/2013

OTHER PUBLICATIONS

"Convex Joint Emitter Localization and Passive Network Synchronisation", O. Jean and A.J. Weiss, IEEE 7th Sensor Array and Multichannel Signal Processing Workshop (SAM), 2012.

(Continued)

*Primary Examiner* — Harry K Liu
(74) *Attorney, Agent, or Firm* — Finnegan, Henderson, Farabow, Garrett & Dunner LLP

(57) ABSTRACT

Provided is a method for determining positions of one or more target receivers, wherein the one or more target receivers and one or more reference receivers receive a plurality of signals transmitted at unknown times from a plurality of sources that are located at unknown positions and not synchronized with each other. The method includes: obtaining times of arrival of the plurality of signals at the one or more target receivers; obtaining a plurality of times of arrival of the plurality of signals at the one or more reference receivers; and computing, based on the plurality of times of arrival of the plurality of signals at the one or more reference receivers, a plurality of reference positions of the one or more reference receivers, and the times of arrival of the plurality of signals at the one or more target receivers. The method may include determining directions of the plurality of sources.

27 Claims, 12 Drawing Sheets

(56) References Cited

U.S. PATENT DOCUMENTS

| | | | | |
|---|---|---|---|---|
| 2012/0165012 A1* | 6/2012 | Fischer | ............... | G01S 5/10 |
| | | | | 455/435.1 |
| 2013/0265193 A1* | 10/2013 | Kennedy | ............... | G01S 19/246 |
| | | | | 342/357.29 |
| 2016/0187458 A1* | 6/2016 | Shah | ............... | H04W 64/00 |
| | | | | 455/456.1 |

OTHER PUBLICATIONS

"Passive Localization and Synchronization Using Arbitrary Signals", O. Jean and A.J. Weiss, IEEE Transactions on Signal Processing, vol. 62, Issue 8, pp. 2143-2150, Apr. 15, 2014.

"Synchronization Via Arbitrary Satellite Signals", O. Jean and A.J. Weiss, IEEE Transactions on Signal Processing, vol. 62, Issue 8, pp. 2042-2055, Apr. 15, 2014.

"On the Impact of Time-of-Departure Knowledge on the Accuracy of Time-of-Arrival Localization", M. Rezar and F. Ricciato, Pervasive and Mobile Computing (submitted), Dec. 3, 2018.

"Position and Velocity Estimation of a Non-Cooperative Source from Asynchronous Packet Arrival Time Measurements", F. Ricciato et al, IEEE Transactions on Mobile Computing, vol. 17, No. 9, pp. 2166-2179, Sep. 1, 2018.

"Matrix, and Enhanced Satellite Positioning", P.J. Duffett-Smith, J. Craig, Fifth IEE International Conference on 3G Mobile Communication Technologies, pp. 364-367, 2004.

Time-Delay and Doppler-Shift Based Geolocation by Semi-Definite Programming, J. Picard and A. Weiss, $20^{th}$ European Signal Processing Conference, Bucharest, Romania, pp. 1189-1193, Aug. 27-31, 2012.

\* cited by examiner

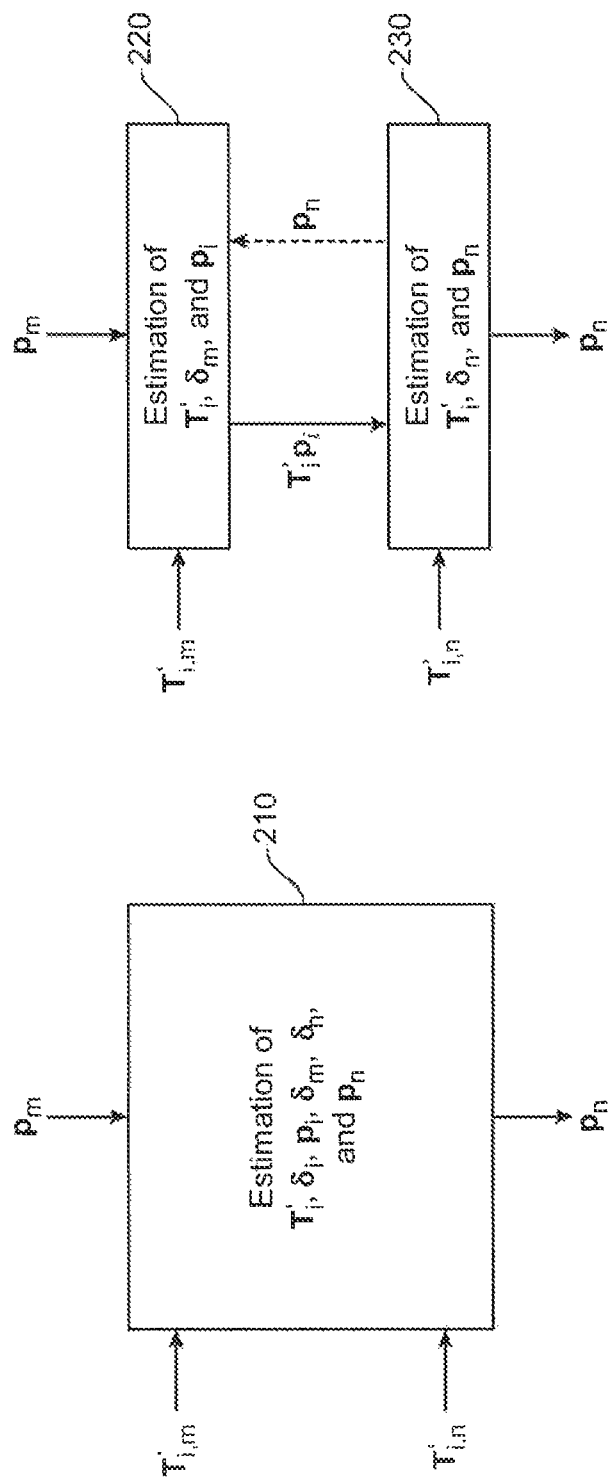

METHOD AND APPARATUS FOR POSITIONING WITH WIRELESS SIGNALS

FIELD

Apparatuses and methods consistent with the present disclosure relate generally to positioning, and more particularly, to methods, systems, and devices for determining a position of a device using signals available in the local environment.

BACKGROUND

Satellite positioning is ubiquitous in modern society. However, there are many cases that a satellite positioning system does not work because satellite signal reception is weak or unavailable, for example, indoors or underground.

In such cases, a positioning system that can utilize other types of signals may be used. For example, wireless signals transmitted from a cellular base station may be used for positioning. Such signals are not necessarily intended for providing a positioning function, and thus, may be called "signals of opportunity" ("SoOp"). An unknown location of a receiver may be estimated by determining a distance between the receiver and a transmitter that transmits the signals of opportunity. However, an accurate location of the transmitter and the timing of transmission may not be available, causing difficulty in utilizing the signals of opportunity in positioning systems.

SUMMARY

According to some embodiments of the present disclosure, there is provided a method for determining positions of one or more target receivers, wherein the one or more target receivers and one or more reference receivers are configured to receive a plurality of signals transmitted at unknown times from a plurality of sources that are located at unknown positions and not synchronized with each other. The method comprises: obtaining times of arrival of the plurality of signals at the one or more target receivers at which each of the one or more target receivers receives at least a portion of a signal transmitted from each of the plurality of sources; obtaining, from the one or more reference receivers, a plurality of times of arrival of the plurality of signals associated with when the one or more reference receivers receive a corresponding portion of the plurality of signals as measured according to local clocks of the one or more reference receivers, wherein the one or more reference receivers are located at a plurality of known reference positions and not synchronized with each other or with the plurality of sources; and determining the positions of the one or more target receivers by computing, based on the plurality of times of arrival of the plurality of signals at the respective one or more reference receivers, the plurality of reference positions, and the times of arrival of the plurality of signals at the one or more target receivers. The one or more reference receivers and the one or more target receivers may be the same type of devices.

In the method, determining the positions of the one or more target receivers may further include: constructing a plurality of equations in which the plurality of times of arrival of the plurality of signals at the respective one or more reference receivers, the plurality of reference positions, the times of arrival of the plurality of signals at the one or more target receivers are known variables; and determining the positions of the one or more target receivers by solving the plurality of equations.

In the method, determining the positions of the one or more target receivers may further include: constructing a first set of equations in which times of arrival of the plurality of signals at a first group of reference receivers among the one or more reference receivers and reference positions of the first group of reference receivers are known variables; determining directions from which the plurality of signals are incident by solving the first set of equations; constructing a second set of equations in which the time of arrival of the plurality of signals at the one or more target receivers, the directions of the plurality of signals, and times of arrival of the plurality of signals at a second group of reference receivers among the one or more reference receivers are known variables; and determining the positions of the one or more target receivers by solving the second set of equations.

In the method, the first group of reference receivers may be different from the second group of reference receivers. The method may further include: inputting the determined positions of the one or more target receivers as additional reference positions so that the one or more target receivers can be used as reference receivers in another determination.

In the method, determining the positions of the one or more target receivers may further include: sending the times of arrival of the plurality of signals at the one or more target receivers, the plurality of times of arrival of the plurality of signals at the respective one or more reference receivers, and the plurality of reference positions to a positioning engine; and receiving position information of the one or more target receivers determined by the positioning engine.

In the method, determining the positions of the one or more target receivers may further include: performing, by at least one of the one or more reference receivers and at least one of the one or more target receivers, a portion of the computing; and communicating computation results between the one or more reference receivers and the one or more target receivers to determine the positions of the one or more target receivers. In the method, the plurality of equations may be constructed based on signals repeatedly transmitted from a transmitter at different points of time.

The method may further include: approximating signal propagation wavefronts in neighborhoods of the one or more target receivers and the one or more reference receivers using a curve or a straight line, wherein an orientation of the curve or the straight line is related to directions of the plurality of signals from the plurality of sources, and wherein a curvature of the curve is used in determining the position of the receiver.

In the method, the plurality of sources may include one or more transmitters of one or more wireless networks. The plurality of sources may include one or more virtual sources arising from objects that reflect the plurality of signals transmitted from the plurality of sources. The plurality of sources may include one or more virtual sources arising from objects that scatter the plurality of signals transmitted from the plurality of sources.

In the method, the plurality of signals received by the one or more reference receivers may be downlink signals transmitted from the plurality of sources. The plurality of signals received by the one or more reference receivers may further include at least one uplink signal transmitted from the one or more target receivers or the one or more reference receivers. The plurality of sources may be not synchronized with each other, when: relative times of the plurality of sources are not known; or relative times of the plurality of sources are known with a magnitude of an accuracy error greater than 3.3 nanosecond.

There is also provided a device configured to determine its position or a position of other devices. The device includes: a receiver configured to: receive a plurality of signals transmitted at unknown times from a plurality of sources that are located at unknown positions and not synchronized with each other; and obtain a time of arrival of the plurality of signals at the receiver at which the receiver receives at least a portion of the plurality of signals; a processor configured to: determine the position of the device by performing a computation based on the time of arrival of the plurality of signals at the receiver, a plurality of times of arrival of the plurality of signals at one or more reference receivers, and a plurality of reference positions of the one or more reference receivers, wherein the plurality of times of arrival of the plurality of signals at the one or more reference receivers are times at which the one or more reference receivers receive a corresponding portion of the plurality of signals as measured according to local clocks of the one or more reference receivers, and the one or more reference receivers are located at known positions and not synchronized with each other.

The device may further include a second receiver configured to receive a second signal from a satellite system. The device may be configured to be used as a reference receiver in a positioning system when: the second signal received from the satellite system determines the position of the device; or the position of the device is determined by the computation. The receiver may be a portion of a transceiver modem configured to transmit the time of arrival of the plurality of signals at the receiver to an external device.

There is further provided an apparatus configured to determine one or more unknown positions of one or more target devices. The apparatus includes: at least one first communication interface configured to: receive, from the one or more target devices, one or more times of arrival of a plurality of signals associated with when the one or more target devices receive a corresponding portion of the plurality of signals transmitted at unknown times from a plurality of sources that are located at unknown positions and not synchronized with each other; and receive, from one or more reference devices, one or more reference positions of the one or more reference devices and times of arrival of the plurality of signals associated with when the one or more reference devices receive a corresponding portion of the plurality of signals as measured according to local clocks of the plurality of reference devices, wherein the one or more reference devices are not synchronized with each other or with the plurality of sources; and at least one processor configured to: determine the one or more unknown positions of the one or more target devices by performing a computation based on the times of arrival of the plurality of signals at the respective one or more reference devices, the one or more reference positions, and the times of arrival of the plurality of signals at the one or more target devices; and at least one second communication interface configured to: transmit information regarding the determined one or more positions of the one or more target devices.

The apparatus may further include a storage configured to store positioning information including directions of the plurality of signals incident to the one or more target devices and the one or more reference devices, wherein the apparatus may be configured to share the positioning information with an external device.

There is further provided a non-transitory computer-readable medium having stored therein instructions that, when executed by a processor, perform a method for determining positions of one or more target receivers, wherein the one or more target receivers and one or more reference receivers are configured to receive a plurality of signals transmitted at unknown times from a plurality of sources that are located at unknown positions and not synchronized with each other. The method may include: obtaining times of arrival of the plurality of signals at the one or more target receivers at which each of the one or more target receivers receives at least a portion of a signal transmitted from each of the plurality of sources; obtaining, from the one or more reference receivers, a plurality of times of arrival of the plurality of signals associated with when the one or more reference receivers receive a corresponding portion of the plurality of signals as measured according to local clocks of the one or more reference receivers, wherein the one or more reference receivers are located at a plurality of known reference positions and not synchronized with each other or with the plurality of sources; and determining the positions of the one or more target receivers by computing, based on the plurality of times of arrival of the plurality of signals at the respective one or more reference receivers, the plurality of reference positions, and the times of arrival of the plurality of signals at the one or more target receivers.

There is further provided a method for determining directions of a plurality of sources with respect to an origin of a system of coordinates, wherein the plurality of sources is not synchronized with each other, and a plurality of signals transmitted at unknown time from the plurality of sources are received by one or more target receivers and one or more reference receivers. The method may include: obtaining times of arrival of the plurality of signals at the one or more target receivers at which each of the one or more target receivers receives at least a portion of a signal transmitted from each of the plurality of sources, wherein the one or more target receivers are located at unknown positions; obtaining, from the one or more reference receivers, a plurality of times of arrival of the plurality of signals associated with when the one or more reference receivers receives a corresponding portion of the one or more signals as measured according to local clocks of the one or more reference receivers, wherein the one or more reference receivers are located at known reference positions and not synchronized with each other or with the plurality of sources; and determining the directions of the plurality of sources with respect to an origin of a system of coordinates by computing, based on the plurality of times of arrival of the plurality of signals at the respective one or more reference receivers, the plurality of reference positions, and the times of arrival of the plurality of signals at the one or more target receivers.

Determining the directions of the plurality of sources with respect to the origin of the system of coordinates may further include: constructing a plurality of equations in which the plurality of times of arrival of the plurality of signals at the respective one or more reference receivers, the plurality of reference positions, and the times of arrival of the plurality of signals at the one or more target receivers are known variables; and determining the directions of the one or more sources by solving the plurality of equations.

Determining the directions of the one or more sources with respect to the origin of the system of coordinates may further include: determining distances between the plurality of sources and the one or more target receivers. Determining the distances between the plurality of sources and the one or more target receivers may include: approximating signal propagation wavefronts in neighborhoods of the one or more target receivers and the one or more reference receivers using a curve or a straight line; and determining curvatures of approximated signal propagation wavefronts.

BRIEF DESCRIPTION OF FIGURES

FIG. 2A is a schematic diagram illustrating an exemplary method of performing a 1-step computation to determine a position of a target receiver, consistent with some embodiments of the present disclosure.

FIG. 2B is a schematic diagram illustrating an exemplary method of performing a 2-step computation to determine a position of a target receiver, consistent with some embodiments of the present disclosure.

DETAILED DESCRIPTION

Figure 1:
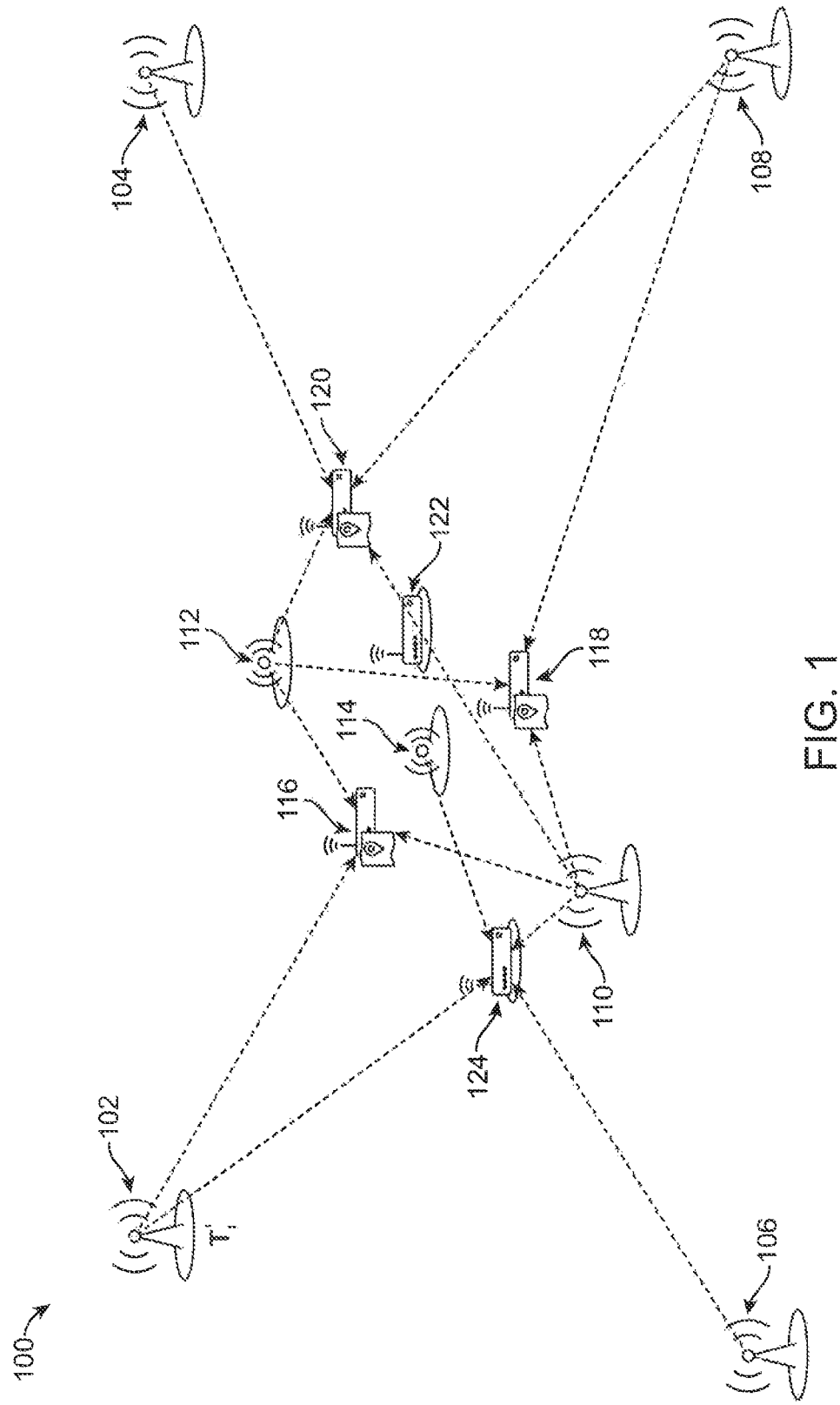
FIG. 1 is a schematic diagram illustrating an exemplary positioning system for determining a position of a receiver, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

In a positioning system, to use signals of opportunity that are transmitted at unknown time from a transmitter disposed at an unknown location, a transmission time and the location of the transmitter may be estimated using multiple reference receivers that receive the signals. The estimation of the transmission time and the location of the transmitter usually requires that the multiple reference receivers be synchronized to an accuracy of nanosecond order. However, such a strict synchronization requirement for the reference receivers is difficult and costly, thus limiting practical application of signals of opportunity in positioning systems.

For example, to meet the strict synchronization requirement, methods using Global Navigation Satellite Systems (GNSSs), atomic clocks, message exchange protocols, or pulse coupling can be used. These methods, however, require dedicated hardware and/or utilization of valuable bandwidth and energy, leading to an increase of cost, power consumption, size, and weight of receivers. Also, use of these methods is also subject to some limitations. As a first example, since GNSS signals are transmitted from satellites with spread-spectrum techniques, their power level may be low on the ground, and thus, reception of GNSS signals is either challenging or impossible indoors as well as in some other harsh propagation environments. For the same reason, GNSS signals are also vulnerable to any interference power in the surroundings of the receivers. As a second example, message exchange protocols or packet coupling methods constantly pass timestamps between the receivers. Because of the intensity of these exchanges, efficient use of the channel capacity and energy should be made and depends on the ability to avoid message collisions. The alternative is using a protocol built around random access of a channel that is known to be inefficient. As a third example, pulse coupling methods require receivers to operate also as secondary sources, which broadcast a periodic signal specific for synchronization. These pulses should reach other receivers with negligible or known propagation delays (which may be achieved in a controlled environment when distances between sources and consequent propagation delays are known) and avoid any mutual interference in the channel. These requirements are difficult to satisfy, especially in adverse propagation environments and with scarce power or bandwidth availability.

Embodiments of the present disclosure provide methods, devices, and systems for determining an unknown position of one or more target receivers, wherein the one or more target receivers and a plurality of reference receivers are configured to receive a plurality of signals transmitted at unknown time from a plurality of sources that are located at unknown positions and not synchronized with each other. In the method, the one or more target receivers obtain times of arrival of the plurality of signals at the one or more target receivers at which each of the one or more target receivers receives at least a portion of the plurality of signals; the plurality of reference receivers obtain a plurality of times of arrival of the plurality of signals associated with when the plurality of reference receivers receive a corresponding portion of the plurality of signals as measured according to local clocks of the plurality of reference receivers, wherein the plurality of reference receivers are located at a plurality of known reference positions and not synchronized with each other or with the plurality of sources; and the unknown position of the target receiver is determined by computation, based on the plurality of times of arrival of the plurality of signals at the respective plurality of reference receivers, the plurality of reference positions, and the times of arrival of the plurality of signals at the one or more target receivers.

Embodiments disclosed in the present disclosure have one or more technical effects. In some embodiments, the methods, devices, and systems may determine an unknown position of a target receiver by utilizing signals transmitted at unknown times from multiple sources that are located at unknown positions and not synchronized with each other. This allows for determination of an unknown position of the target receiver freely worldwide, without depending on an operator of the multiple sources. In some embodiments, the methods, devices, and systems may jointly solve for all the unknown parameters in the positioning system (e.g., the transmission times and the locations of the multiple sources, the time offsets, the unknown position of the target receiver, etc.) using a set of equations, without requiring any additional hardware. This allows for efficient and flexible utilization of unsynchronized signals and unsynchronized reference receivers, leading to enhanced cost effectiveness, versatility, practicability, and portability. In some embodiments, in addition to, or as an alternative to, the signals from the multiple sources, the methods, devices, and systems may further utilize signals arising from reflection or scattering by apparent signal sources. By utilizing the apparent sources, the positioning can be performed anywhere, even under difficult propagation conditions (e.g., indoors), as the receivers may capture reflected or scattered signals for the positioning. In some embodiments, in solving the set of equations, the methods, devices, and systems may discriminate between different degrees of angular diversity of the signals that correspond to at least one of: a planar wavefront approximation, a fixed-curvature wavefront approximation, or a wavefront curve evaluated from an estimation of a source point in space. By estimating incident directions of the signals and choosing a proper local approximation of the wavefronts, the need to determine the distances from the signal sources or actual locations of the signal sources may be eliminated, and thus, reducing the number of unknowns (thus reducing the number of measurements needed) and the consequent space of solutions, leading to an enhanced coverage area for positioning and reduced costs, power consumption and traffic communicating the measurements of the positions of the target receivers. In some embodiments, in addition to downlink signals, the methods, devices, and systems may also utilize uplink signals in the positioning system. This allows for enriched geospatial topology of the signal sources and the content of ranging information of the signals of opportunity used by the positioning system, leading to enhanced accuracy of the estimation of the target receiver positions.

FIG. 1 is a schematic diagram illustrating an exemplary positioning system, consistent with some embodiments of the present disclosure. Referring to FIG. 1, an exemplary positioning system 100 comprises multiple signal sources (sources 102, 104, 106, 108, 110, 112, and 114), multiple reference receivers (references 116, 118, and 120), and multiple target receivers (targets 122 and 124). Among the multiple signal sources, sources 102-110 may be signal transmitters that generate and transmit wireless signals. Sources 112 and 114 may be apparent (virtual) sources arising from objects that reflect or scatter the wireless signals transmitted from sources 102-110, as discussed with regard to FIG. 6. Sources 112 and 114 may be positioned in fixed locations or movable during the signal positioning process. In some embodiments, the signal transmitters may be cellular base stations and the signals may be wireless cellular signals. However, the signals are not so limited, and any electromagnetic wave transmitted from any sources can be used in the positioning system.

In some embodiments, the multiple signal sources may be disposed at positions that are unknown to the multiple reference receivers and the multiple target receivers. In some embodiments, the multiple signal sources may not actively or knowingly participate to the positioning system, and the times at which the signals are transmitted from the multiple signal sources ("transmission time") may be unknown to the multiple reference receivers and the multiple target receivers. In some embodiments, the multiple signal sources may belong to different networks and thus may be unaware of one each other.

In some embodiments, the multiple signal sources may not be synchronized with each other and their relative timing is not known with a sufficient accuracy. In an embodiment, sources 102-110 may be completely unsynchronized from each other and their relative timing is completely unknown. In another embodiment, there may be some knowledge about the relative timing of sources 102-110 but this may be insufficient or inaccurate to provide the performance needed for positioning purposes. In one embodiment, a magnitude of an accuracy error of synchronization of the signal sources may be 3.3 nanosecond (ns) or less. In another embodiment, the magnitude of the accuracy error of synchronization of the signal sources may be 1 nanosecond (ns) or less. In some embodiments, the multiple signal sources may have the same or similar clock frequency over the lifetime of a positioning operation.

In some embodiments, the multiple target receivers (targets 122 and 124) may be disposed at unknown positions and their positions are to be estimated by positioning system 100. FIG. 1 shows two target receivers, but the number of the target receivers is not so limited, and any number of the target receivers can be localized in a positioning process. Each of the target receivers may be configured to receive at least a portion of signals from the multiple signal sources. In some embodiment, at least one of the multiple target receivers may be a portion of a transceiver modem that includes a signal transmitter.

In some embodiments, the multiple reference receivers (references 116, 118, and 120) may be disposed at multiple known positions and configured to receive the signals from the multiple signal sources. FIG. 1 shows three reference receivers, but the number of the reference receivers is not so limited, and any number of the reference receivers can be used in a positioning process. In an embodiment, there are at least three reference receivers. In an embodiment, the multiple reference receivers may be disposed at fixed positions. In another embodiment, the multiple reference receivers may be in motion, but their moving paths may be tracked such that their positions are known during a positioning process. The multiple reference receivers may be disposed randomly or as an array. In some embodiments, at least one of the multiple reference receivers may be a portion of a transceiver modem that includes a signal transmitter. In an embodiment, the multiple reference receivers and the multiple target receivers may be the same type of devices. In another embodiment, the multiple reference receivers and the multiple target receivers may be different types of devices. In some embodiments, a reference receiver and a target receiver may be the same physical device. For example, a single device may at one time play the role of a reference receiver by collecting measurements at known locations, and then at another time (normally but not necessarily later), play the role of a target receiver, being at an unknown location.

In some embodiments, the multiple reference receivers may not be synchronized with each other and their relative timing is not known with sufficient accuracy. In one embodiment, references 116, 118, and 120 may be completely unsynchronized from each other and their relative timing is completely unknown. In another embodiment, there may be some knowledge about the relative timing of references 116, 118, and 120, but this may be insufficient or inaccurate to provide the performance needed for positioning purposes. In an embodiment, a magnitude of an accuracy error of synchronization of the multiple reference receivers may be 1 nanosecond (ns) or less. In some embodiments, the multiple reference receivers may have the same or similar clock frequencies over the lifetime of a positioning process.

In some embodiments, the positions and the transmission times of the multiple signal sources are unknown to the multiple reference receivers and thus, the signals from the multiple signal sources are arbitrary signals of opportunity transmitted at unknown times from unknown locations. The interactions between the multiple signal sources and the multiple reference receivers may be passive, for example, there may be no active exchange of ranging information between them.

Upon receipt of the signals from the multiple signal sources, the multiple reference receivers and the multiple target receivers obtain the times of arrival of the signals at the receivers. In some embodiments, upon reception of the signals, the multiple reference receivers and the multiple target receivers may obtain time information that may come in various forms, such as a time-stamped waveform, a channel impulse response following correlation against an expected signal, a set of measured path arrival times with their signal levels, or a time of arrival estimate. The time information may be further processed to extract an arrival time of a signal. In the case that the signals arrive through a multipath, the time information is further processed to extract a set of possible arrival times of a signal.

In some embodiments, reference receivers may send the times of arrival of the signals at the reference receivers to a computing system (e.g., a positioning engine) along with the location information of the reference receivers for a computation by the computing system. Similarly, the target receivers may also send the times of arrival of the signals at the target receivers to the computing system for the computation. The times of arrival of the signals at the reference receivers, the location information of the reference receivers, and the times of arrival of the signals at the target receivers are then used in location and timing equations. The unknown positions of the target receivers can be determined by solving the equations. In an embodiment, the computation may be performed by the computing system. In another embodiment, the computational burden is distributed among the reference receivers and target receivers.

In some embodiments, the positioning system may take as inputs the reference receiver locations ($p_m$), the times of arrival of the signals at reference receivers ($T'_{i,m}$), and the times of arrival of the signals at the target receivers ($T'_{i,n}$), and return as outputs the positions of the target receivers ($p_n$), which are hidden variables inferred through the unknown locations of the signal sources ($p_i$). In some embodiments, in addition to the signal source locations, the time offsets of the reference receivers and the time offsets of the target receivers ($\delta_m$ and $\delta_n$) may also be inferred in the positioning process. For example, for $N_S$ signal sources, $N_R$ reference receivers, and $N_T$ target receivers at a certain time instant identified by the variable t, the positions of the target receivers may be determined by:

$$cT'_{i,m}(t) = cT_i(t) + c\delta_i(t) + \|p_m(t) - p_i(t)\| + c\delta_m(t) \quad \text{(Equation 1)}$$

$$cT'_{i,n}(t) = cT_i(t) + c\delta_i(t) + \|p_n(t) - p_i(t)\| + c\delta_n(t) \quad \text{(Equation 2)}$$

where $i=1, \ldots, N_S$, $m=1, \ldots, N_R$, and $n=1, \ldots, N_T$, $\delta_i(t)$ denotes time offsets of the sources, T denotes signal transmission or times of arrival of the signals in a common time scale, and T' denotes signal transmission or times of arrival of the signals affected by the time offsets, for example, as measured by a local clock in a device. The second set of equations may be constructed and solved such that every target position may be determined separately from the other receivers. These variables may be scalar variables or vector functions of deterministic (e.g., geometric) and random variables.

In some embodiments, the time offsets (e.g., $\delta_m$ and $\delta_n$) may be cancelled upfront by differencing equations from the sets of observables. The time offsets related to the same signal transmission may be cancelled by subtracting observables of each signal source across different receivers. Similarly, time offsets related to the same reference receiver may be cancelled by subtracting observables of multiple sources at each receiver. While it may not be necessary to know the absolute values of the time offsets, their relative values can be estimated to converge to a common and virtual time reference. Since the time scale followed by the source ($T_i$) is likely to be unknown, it may be incorporated with the respective offset:

$$T'_i(t) = T_i(t) + \delta_i(t) \quad \text{(Equation 3)}$$

Thus, a set of $N_S(N_R+N_T)$ equations are formulated as:

$$cT'_{i,m}(t) = cT'_i(t) + \|p_m(t) - p_i(t)\| + c\delta_m(t) \quad \text{(Equation 4)}$$

$$cT'_{i,n}(t) = cT'_i(t) + \|p_n(t) - p_i(t)\| + c\delta_n(t) \quad \text{(Equation 5)}$$

In some embodiments, at least two sources may be used in the positioning system. In some embodiments, solving the set of $N_S(N_R+N_T)$ equations defined by Equation 4 and Equation 5 may need estimation of the directions and the ranges of the locations of the signal sources. These locations may be inferred from the reference receivers and the target receivers only through the signals observed, hence their distances and angles respectively correspond to the curvatures and the angles of the incident spherical waves that arrive with different time offsets at different receiver locations. Such an estimation problem may then be conceived as fitting wavefronts to the observations of signals received. In some embodiments, absolute times of the reference receivers and the target receivers may also be included as unknown terms in the equations. These unknown terms may be estimated by solving the equations or may be removed by manipulation of the equations. The absolute times of the reference receivers and the target receivers may be obtained from local clocks included in the reference receivers or the target receivers.

In one embodiment, a set of times of arrival of the signals at a reference receiver may be accumulated from repetitive signal transmissions from a signal source. In this embodiment, the reference receiver may obtain knowledge of a period of the repetitive signal transmissions, without any interaction with the signal source. For example, the reference receiver may obtain the knowledge from the signal sources used in the previous positioning of neighboring areas and stored in the system. The set of times of arrival of the signals obtained from the repetitive signal transmissions may be used to formulate a set of equations and a number of unknowns may be estimated by solving the equations.

The estimation problem underlying the positioning system may be nonlinear and non-convex such that a cost function defined as a difference between the observables and the formulation of the time-based characteristics of the propagation channel need to be minimized. In some embodiments, the solutions may be calculated by means of deterministic, statistical, and heuristic methods for global optimization. For example, Bayesian statistics may be used leveraging a-priori hypotheses about the local signal wavefront curvatures. Also, the problem may be simplified through convex relaxation in order to resort to low-complexity solvers or algebraic solutions.

By jointly solving for all the unknowns in the positioning system (e.g., the transmission times and the locations of the sources, the time offsets, the unknown positions of the target receivers, etc.) using a set of equations, without utilizing special hardware, the positioning method allows for unrestrained utilization of unsynchronized signals and unsynchronized reference receivers, leading to enhanced cost effectiveness, versatility, practicability, and portability. Further, the positioning method can be performed even on low-power and inexpensive hardware or implemented within devices of opportunity (e.g., cellular modems or wireless access points), leading to enhanced connectivity. Moreover, since sources of signals of opportunity are prevalently terrestrial transmitters lying nearby and usually operated for communication purposes, their coverage could penetrate through outdoor and indoor environments, leading to increased area of positioning.

Figure 4A:
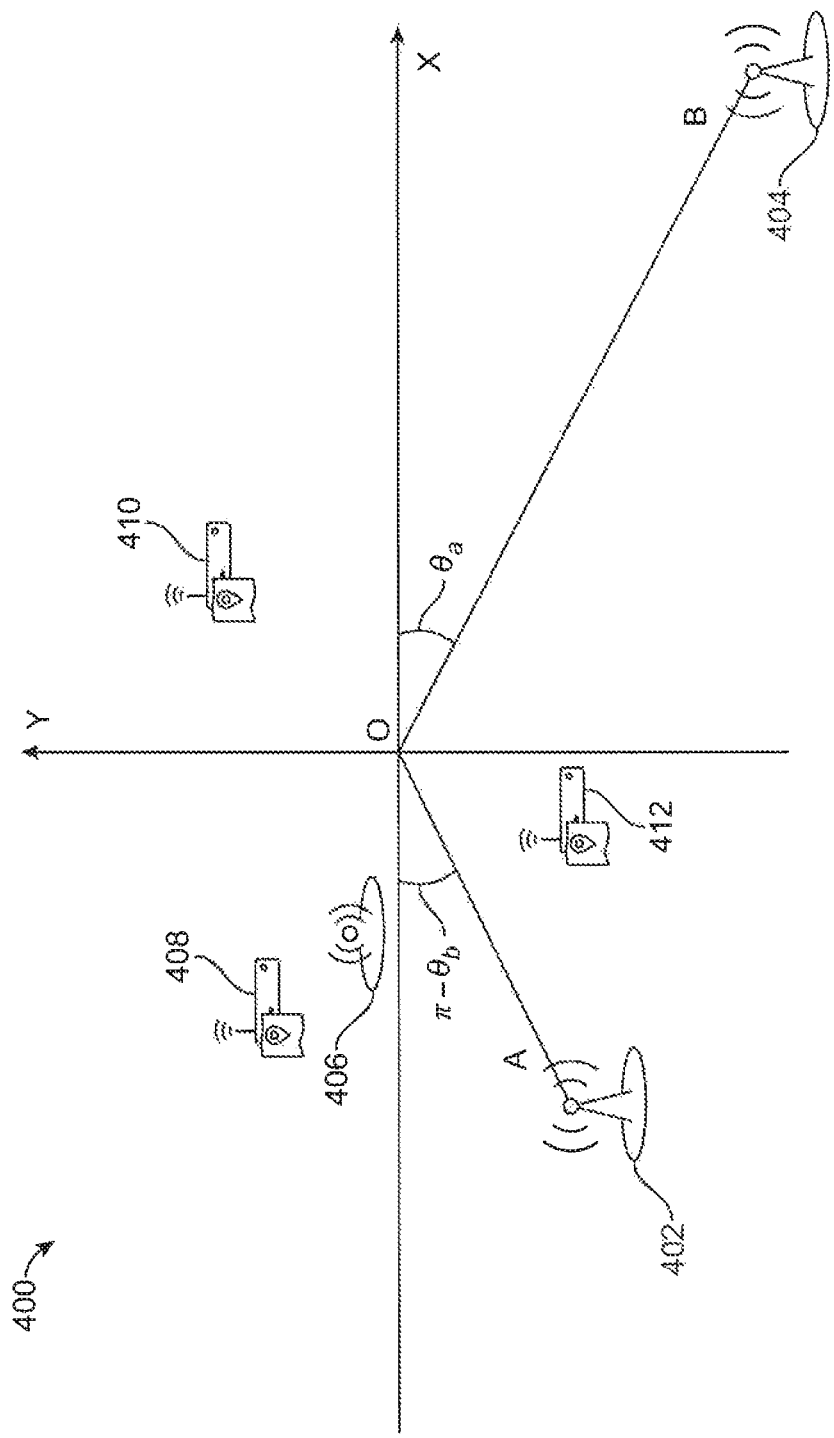
FIG. 4A is a schematic diagram illustrating directions of signal sources with respect to an origin of a coordinate system in a positioning system, consistent with some embodiments of the present disclosure.

FIG. 2A is a schematic diagram illustrating an exemplary method of performing a 1-step computation, consistent with some embodiments of the present disclosure. Referring to FIG. 2A, a positioning system may receive as inputs reference positions of multiple reference receivers $p_m$, times of arrival of the signals at the reference receivers $T'_{i,m}$, and times of arrival of the signals at multiple target receivers $T'_{i,n}$, and perform a 1-step estimation 210. The positions $p_i$ and the time offsets of the signal sources may be estimated together with time offsets of the reference receivers $\delta_m$ and the positions $p_n$ and time offsets $\delta_n$ of the target receivers. The positioning system may return as outputs the estimated positions of the target receivers $p_n$. In some embodiments, absolute times of the reference receivers and the target receivers may also be included as unknown terms in the equations. These unknown terms may be estimated by solving the equations or may be removed by manipulation of the equations. In an embodiment, instead of estimating positions of sources $p_i$, directions of the sources with respect to an origin of a coordinate system in the positioning system are estimated, as shown in FIG. 4A, as more fully described below. Estimating directions of sources, without estimating ranges or locations of the sources, allows for reduced number of measurements for the positioning, leading to enhanced coverage area of positioning, and reduced costs and power consumption.

FIG. 2B is a schematic diagram illustrating an exemplary method of performing a 2-step computation. In some embodiments, as shown in FIG. 2B, the estimation may be divided as two separate and consecutive estimations, i.e., an estimation 220 and an estimation 230. The estimation 220 may be an estimation of source localization and the estimation 230 may be an estimation of the target positioning. During estimation 220, the times of arrival of the signals at the reference receivers $T'_{i,m}$ and the reference positions of the reference receivers $p_m$ may be used to estimate unknown parameters related to the sources, for example, transmission times of the sources $T'_i$ and locations of the sources $p_i$. The estimated unknown parameters related to the sources ($T'_i$ and $p_i$) are then used for estimation 230 for estimating the positions of the target receivers.

In an embodiment, a second set of times of arrival of the signals at the reference receivers may be used in estimation 230. The second set of times of arrival of the signals at the reference receivers may be the same as or different from the times of arrival of the signals at the reference receivers used in estimation 220. In some embodiments, the time offsets of the reference receivers $\delta_m$ may also be used in estimation 230. The estimated positions of the target receivers may be fed back to estimation 220 for iterative reuse.

In some embodiments, the estimated time offsets, the signal source locations, and the information of the signals (e.g., frequency) may be stored and reused, for example, in positioning in neighboring areas or for other purposes by other systems. In some embodiments, once a position of a target receiver is estimated, the target receiver may be used as a new reference receiver and the position estimate may be fed back in input as a reference, together with its estimation confidence. In some embodiments, absolute times of the reference receivers and the target receivers may also be included as unknown terms in the equations. These unknown terms may be estimated by solving the equations or may be removed by manipulation of the equations.

In this way, the positioning system may determine the positions of the multiple target receivers by utilizing signals of opportunity transmitted from unknown signal sources at unknown time, without requiring synchronization of the signal sources or synchronization of the reference receivers, leading to enhanced efficiency and reduced cost in utilizing signals of opportunity in positioning.

Figure 3B:
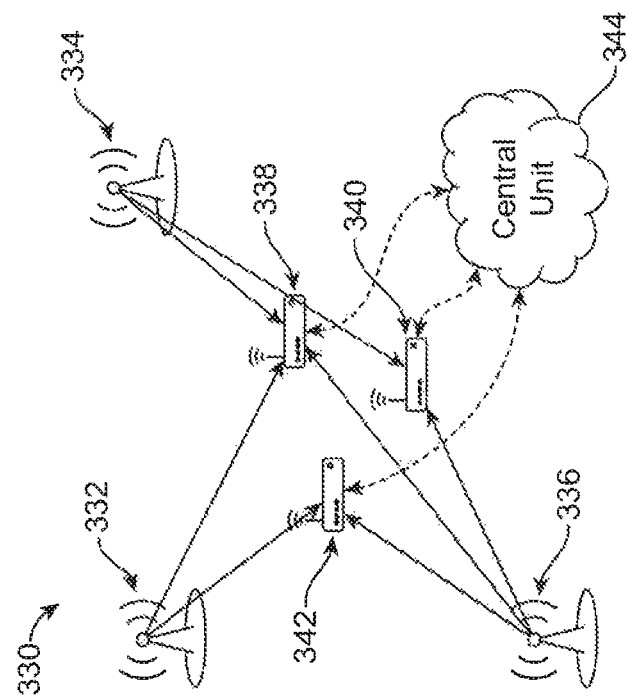
FIG. 3B is a schematic diagram illustrating a central computation scheme of a positioning system, consistent with some embodiments of the present disclosure.
Figure 3A:
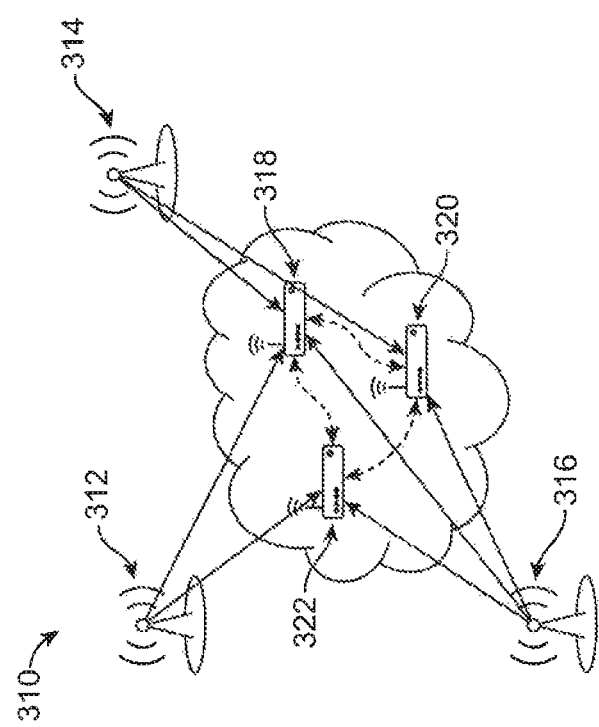
FIG. 3A is a schematic diagram illustrating a distributed computation scheme of a positioning system, consistent with some embodiments of the present disclosure.

FIG. 3A is a schematic diagram illustrating a distributed computation scheme of a positioning system, consistent with some embodiments of the present disclosure. Referring to FIG. 3A, a positioning system 310 may comprise multiple signal sources (sources 312, 314, and 316), multiple reference receivers (e.g., at least three), and multiple target receivers. For the sake of simplicity, FIG. 3A omits some receivers and only shows three (receivers 318, 320, and 322). However, the numbers of signal sources, target receivers, and reference receivers may not be so limited. It may be more beneficial in localizing more than one target receiver, as multiple target receivers may generate more equations than they do unknowns, thereby improving efficiency of the determination. In some embodiments, one or more receivers may be part of one or more transceiver modems that include one or more transmitters. In some embodiments, the signal sources transmit wireless signals to the receivers, and the receivers may obtain a plurality of times of arrival of the signals. A set of equations may be formulated using the plurality of times of arrival of the signals and the reference positions of the reference receivers and the time of arrival of the signals at the target receiver. In this scheme, the burden of solving the set of equations may be shared by the reference receivers and the target receiver, and each of the receivers communicates with other receivers to share the measured parameters and estimated parameters, as shown by the dotted arrows in FIG. 3A. For example, receiver 318 is in communication with receiver 320 and receiver 322 to jointly perform the computation.

FIG. 3B is a schematic diagram illustrating a central computation scheme of a positioning system, consistent with some embodiments of the present disclosure. Referring to FIG. 3B, a positioning system 330 may comprise multiple signal sources (sources 332, 334, and 336), multiple receivers (receivers 338, 340, and 342), and a central unit 344.

Receivers 338, 340, and 342 may comprise one target receiver whose position is to be determined and two reference receivers disposed at known reference positions. However, the numbers of signal sources, target receivers, and reference receivers may not be so limited. It may be more beneficial in localizing more than one target receiver, as multiple target receivers may generate more equations than they do unknowns, thereby improving efficiency of the determination. In some embodiments, one or more receivers may be part of one or more transceiver modems that include one or more transmitters. In some embodiments, sources 332, 334, and 336 may transmit wireless signals to the receivers, and the receivers may obtain a plurality of times of arrival of the wireless signals. The reference receivers may transmit the times of arrival of the signals and the reference positions to central unit 344. Similarly, the target receiver may also transmit the time of arrival of the signals at the target receiver to central unit 344. Central unit 344 may formulate a set of equations using the plurality of times of arrival of the signals and the reference positions. Central unit 344 may be a local computer, a server computer, a cloud computer, or any device that can perform the computation. In one embodiment, central unit 344 may be a positioning engine running in the target receiver such that the target receiver can perform the entire computation. In another embodiment, central unit 344 may be a positioning engine running in one of the reference receivers such that the reference receiver can perform the entire computation.

FIG. 4A is a schematic diagram illustrating directions of signal sources with respect to an origin of a system of coordinates in a positioning system, consistent with some embodiments of the present disclosure. In some embodiments, in solving the equations (e.g., Equations 1-7 above) to determine a position of a target receiver, the directions of the sources may be estimated, rather than the positions of the sources and transmission times of the signals. Referring to FIG. 4A, a positioning system 400 comprises multiple signal sources (sources 402, 404, and 406) and multiple reference receivers (references 408, 410, and 412). Positioning system 400 may also comprise multiple target receivers (not shown). As shown in FIG. 4A, directions of sources 402, 404, and 406 may be expressed with respect to an origin O of x-y coordinate system. For example, a direction of source 404 may be expressed as an angle $\theta_a$ between a line connecting origin O and source 404 (OB) and the x-axis. Similarly, a direction of source 402 may be expressed as an angle $(\pi-\theta_b)$ between a line connecting origin O and source 402 (OA) and the x-axis. By solving the equations, the directions $(\theta_a, \theta_b)$ of sources 404 and 402 can be determined. The origin of the system of coordinates may be set at a point within the positioning system. In an embodiment, the origin of the coordinate system may be set as a center of an area formed by references 408, 410 and 412 connecting the reference receivers. In some embodiments, positioning system 400 may use spherical coordinate system and express the directions of the sources using both polar angles and azimuthal angles, to take into account differences in altitude of the locations of the sources and receivers.

Figure 4B:
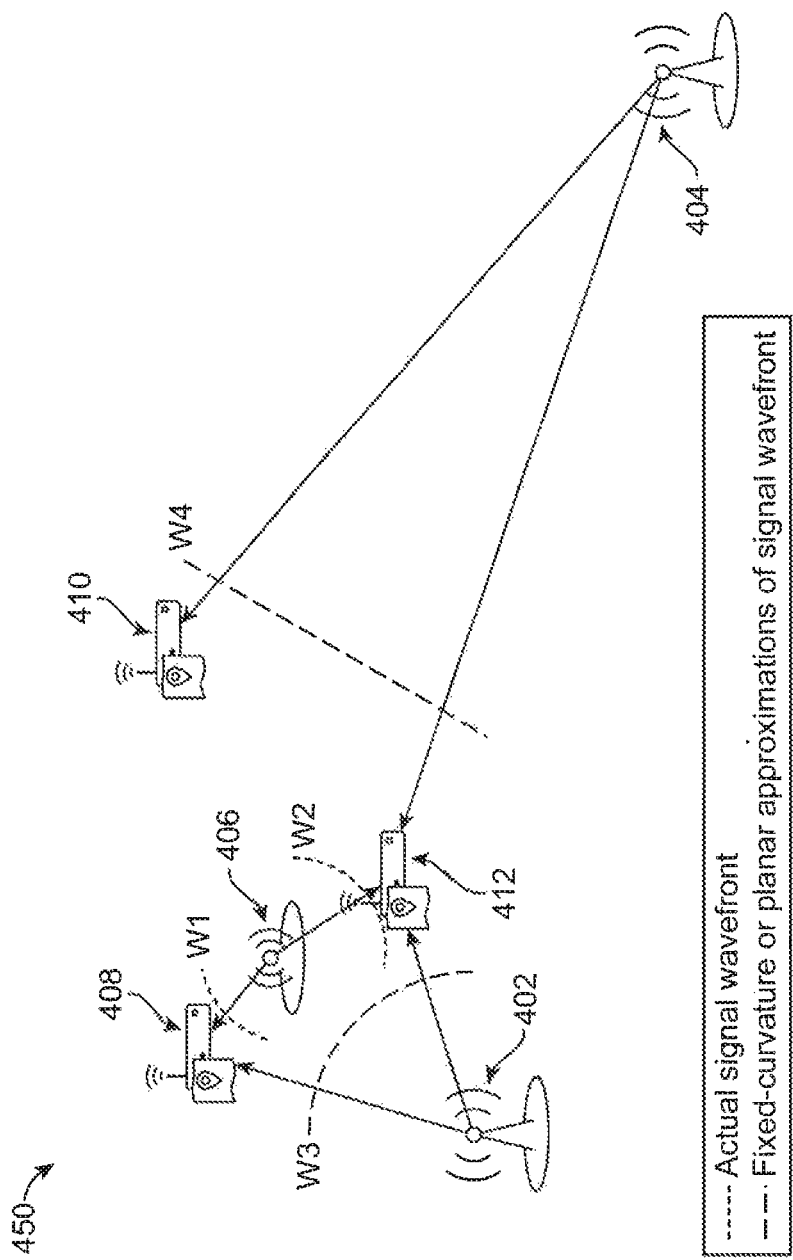
FIG. 4B is a schematic diagram illustrating signal wavefront approximations in a positioning system, consistent with some embodiments of the present disclosure.

Referring to FIG. 4B, a positioning system 450 may comprise multiple signal sources (sources 402, 404, and 406) and multiple reference receivers (references 408, 410, and 412). Positioning system 450 may also comprise multiple target receivers (not shown). As shown in FIG. 4B, signals transmitted from source 406 are incident to references 408 and 412. Since source 406 is in close proximity of references 408 and 412, a signal wavefront W1 at reference 408 and a signal wavefront W2 at reference 412 may be actual signal wavefronts, without an approximation.

In some embodiments, signals transmitted from source 402 are also incident to references 408 and 412. However, source 402 is not located in close proximity of references 408 and 412, and thus, a wavefront W3 of the signals from source 402 may be approximated as a curve. A curvature of a propagation wavefront (e.g., W3) is inversely proportional to a distance between a source and a receiver (e.g., the distance between source 402 and reference 412). For the wavefronts whose curvatures are either approximated as non-zero values or estimated, both direction of the sources and distances between sources and receivers can be obtained, identifying a point in space (expressed either as direction and range, or alternatively as latitude and longitude). In an embodiment, the range of source 402 may be fixed to a value (as shown with the arrow between reference 408 and reference 412), and a curvature of wavefront W3 may be fixed. As such, the approximation may be referred to as a fixed-curvature wavefront approximation.

In some embodiments, signals transmitted from source 404 are incident to references 410 and 412. Source 404 is located far away from references 410 and 412, and thus, a wavefront W4 of the signals from source 404 may be approximated as a plane, or a straight line (e.g., W4) in two dimensional, and the signals may be considered as coming from infinitely-distant sources. This approximation may be referred to a planar wavefront approximation.

Figure 4C:
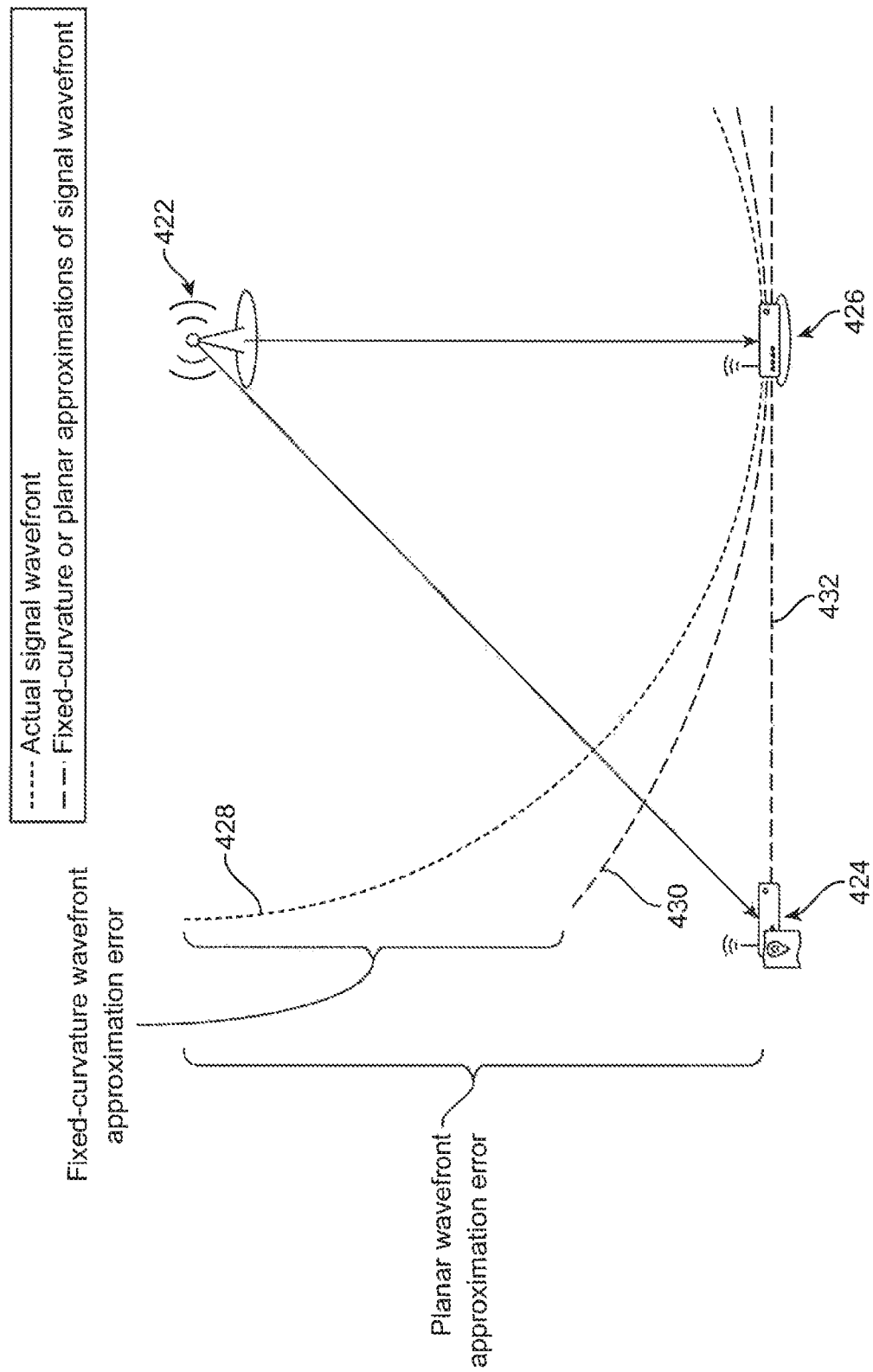
FIG. 4C is a schematic diagram illustrating errors of the signal wavefront approximations, consistent with some embodiments of the present disclosure.

The errors introduced by the fixed-curvature wavefront approximation and the planar wavefront approximation may be estimated. Referring to FIG. 4C, a positioning system comprises a signal source (source 422), a reference receiver (reference 424) and a target receiver (target 426). The signals transmitted from source 422 are incident to reference 424 and target 426 and an actual wavefront of the signals is shown as a curve 428, a fixed-curvature wavefront approximation is shown as a curve 430, and a planar wavefront approximation is shown as a line 432. The distance between source 422 and reference 424 is much greater than the distance between source 422 and target 426. As shown in FIG. 4C, the errors introduced by using approximation at target 426 is negligible comparing with the errors introduced by using approximation at reference 424.

In some embodiments, a curvature may be estimated by a priori information. Such a priori information may be probabilistic, based on local observations, statistical analysis, or on usual design practices in the configuration of wireless infrastructure. In some embodiments, a curvature may be estimated based on a power level of a received signal (a stronger signal is likely originated from a closer source). These estimations may be used in estimating a most probable direction of incident signals. In some embodiments, a probability distribution of the direction of the incident signals is estimated. In some embodiments, in approximating the curvature of a signal wavefront from any source to two receivers, a second-order Taylor expansion may be used. That is:

$$\|p_i - p_m\| = \sqrt{\|p_i\|^2 + \|p_m\|^2} \sqrt{1 - \frac{2 p_m^T p_i}{\|p_i\|^2 + \|p_m\|^2}} \approx \qquad \text{(Equation 6)}$$

$$\|p_i\| - \frac{p_m^T p_i}{\|p_i\|} \mp \frac{(p_m^T p_i)^2}{2\|p_i\|^3}$$

where the maximum approximation error may be given by the following second-order term:

$$\frac{(p_m^T p_i)^2}{2\|p_i\|^3} \sim \frac{\|p_m\|^2}{2\|p_i\|} \qquad \text{(Equation 7)}$$

The maximum approximation error is proportional to the ratio between receivers' mutual distances and the range of the source, hence to the local flatness of the wavefront. Therefore, it may be relatively safe to assume curvatures for signals transmitted far away, whose curvatures are locally comparable, while it may entail more risk when dealing with transmitters nearby, whose curvatures can be very diverse.

In some embodiments, the positioning system may adopt one or both approximations for describing signal wavefronts, when benefits of the simplification outweigh the errors introduced. In some embodiments, for the signals whose source locations are estimated only in terms of direction, their use for estimating the target receiver positions may rely on angle estimates, and their wavefronts at the target receivers may need to be approximated. For example, if using the 2-step scheme as shown in FIG. 2, estimation of the position of the target receivers may be performed with the directions and curvatures of the signal wavefronts identified during the source localization.

By estimating directions of the signals sources and choosing a local approximation of the wavefronts, the need to determine the distances from the signal sources or actual locations of the signal sources may be eliminated, and thus, reducing the number of unknowns and the consequent space of solutions, leading to reduced cost and an efficient and accurate determination of the positions of the target receivers.

Figure 5A:
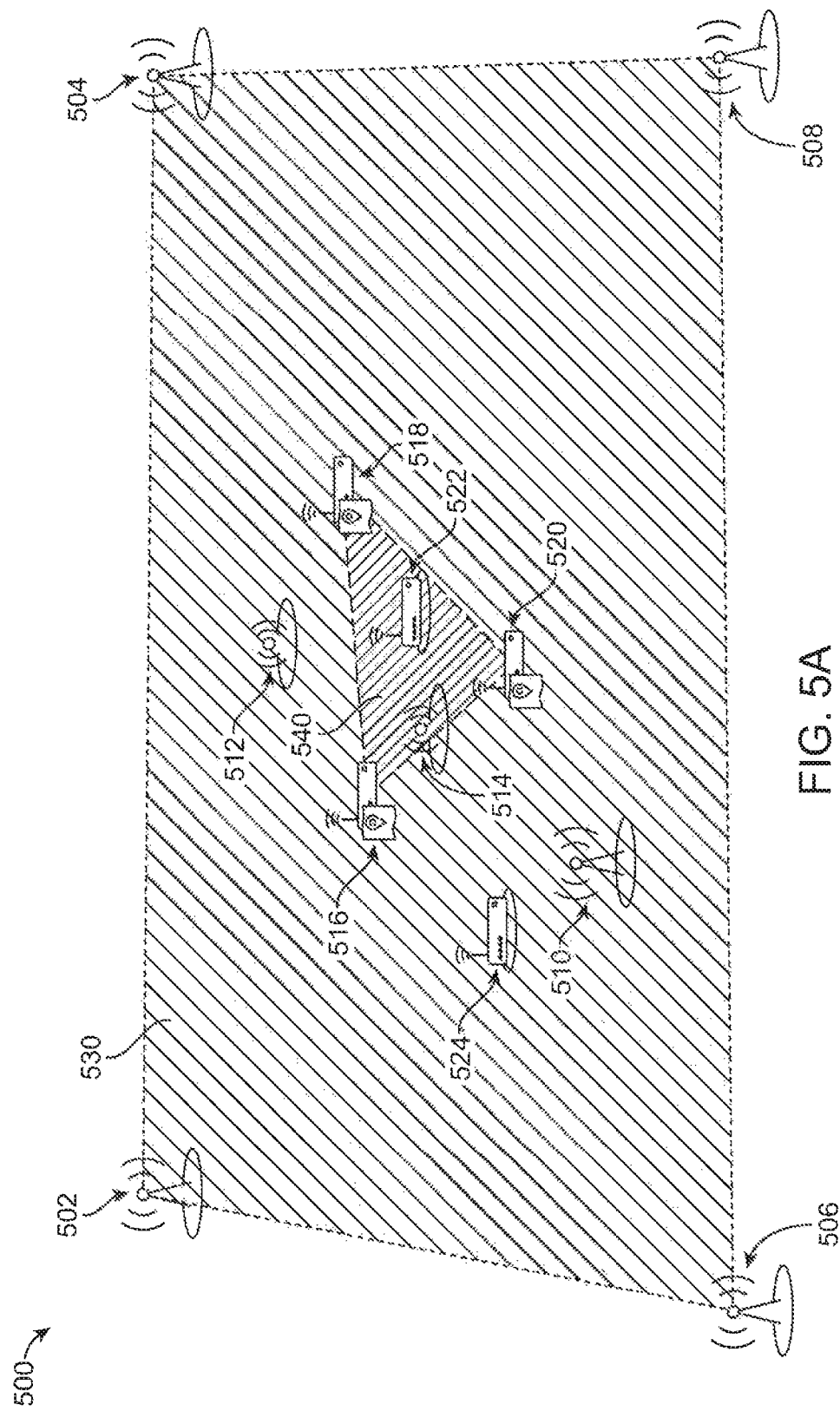
FIG. 5A is a schematic diagram illustrating a convex hull of sources and a convex hull of reference receivers in a positioning system, consistent with some embodiments of the present disclosure.

FIG. 5A is a schematic diagram illustrating a convex hull of signal sources and a convex hull of reference receivers in a positioning system, consistent with some embodiments of the present disclosure. Referring to FIG. 5A, a positioning system 500 may comprise multiple signal sources (sources 502, 504, 506, 508, 510, 512, and 514), multiple reference receivers (references 516, 518, 520), and multiple target receivers (targets 522 and 524). An area 530 enclosed by the sources 502, 504, 506, and 508 may form a convex hull of the sources, and an area 540 enclosed by references 516, 518, and 520 may form a convex hull of the references. In some embodiments, the coverage of positioning system 500 may be identified by the area where the position of target receivers can be found with reasonable confidence and precision. In an embodiment, the precision may be defined as a pure geometric function of the sources-receivers topology, without considering noise and other signal-related features. In this embodiment, the coverage of positioning system 500 may be a region of space where a geometrical dilution of precision (GDOP) of the signals is suitable for the target position estimation.

Figure 5B:
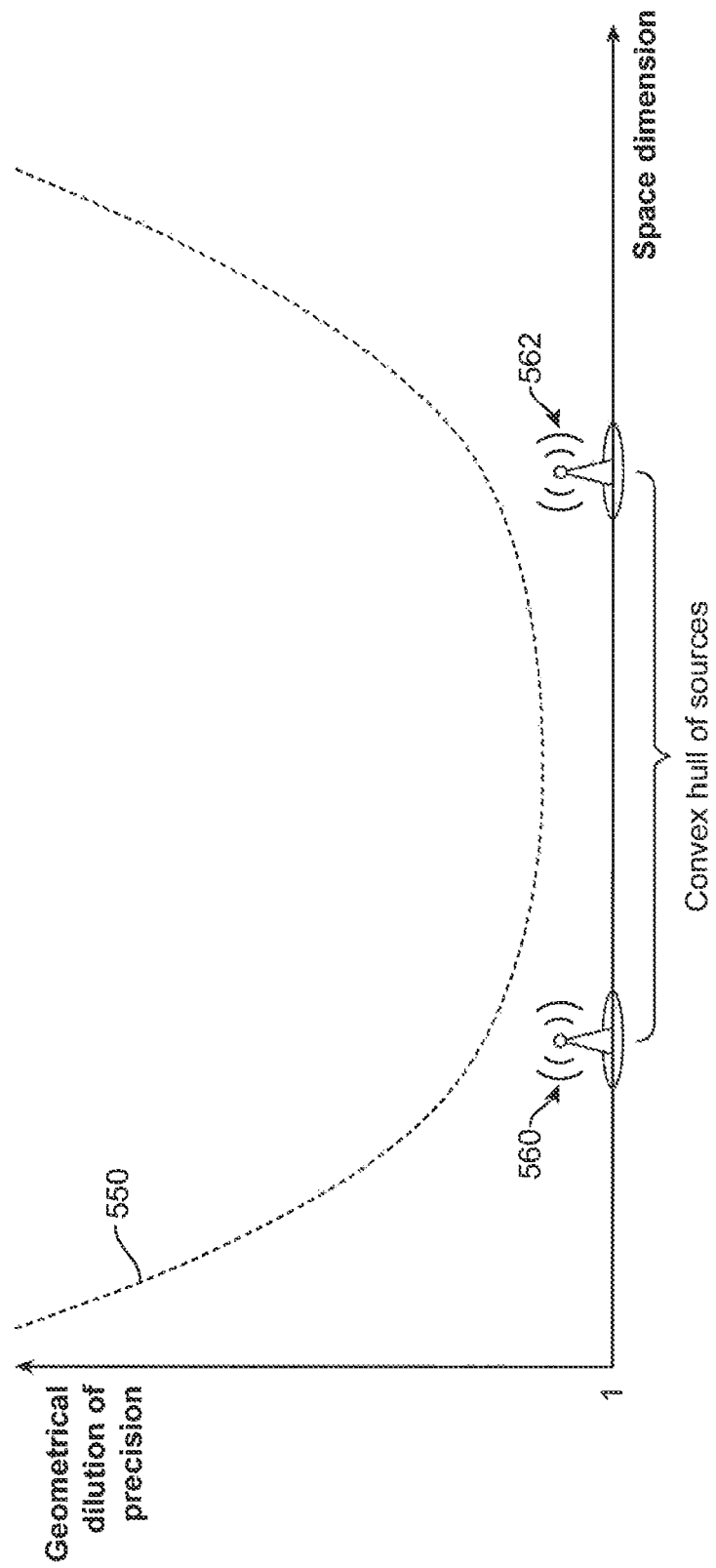
FIG. 5B is a schematic diagram illustrating geometrical dilution of precision as a function of space dimension, consistent with some embodiments of the present disclosure.

FIG. 5B is a schematic diagram illustrating geometrical dilution of precision as a function of space dimension, consistent with some embodiments of the present disclosure. As shown in FIG. 5B, a geometrical dilution of precision 550 of signals is a function of dimension in three-dimensional space that includes sources 560 and 562. GDOP 550 tends to be flat and linear inside the convex hull of sources 560 and 562, whereas it significantly increases outside of the convex hull of sources 560 and 562.

Referring back to FIG. 5A, the coverage of positioning system 500 may enclose the convex hull 530 of sources 502-508, which is a region of space where the GDOP of the signals may have lowest values. As a result, sources that are relatively distant from all the reference receivers and the target receivers may be the most convenient in terms of coverage as they expand the convex hull delimited by their locations, with the result of extending the positioning of targets well beyond the positions of the reference receivers. In an embodiment, the coverage of positioning system 500 may be adjusted based on other parameters, for example, the power of sources, the propagation phenomena of the channels, and the radiation pattern of receivers.

In some embodiments, the directions of the sources 502-508 may include angular components that locate the sources over a line, regardless of their distance from a center of the convex hull 540 of the reference receivers. For simplicity, the center of the convex hull 540 may be considered as the origin of the positioning system of coordinates. In some embodiments, the directions of the sources may be obtained from the ranging information of the signals arriving at the receivers. In an embodiment, in a three-dimensional space, the angular components may be two angles between the three axes of the system of coordinates and the distance vector that goes from the origin to the location point. In a spherical coordinate system, they are known as azimuth and elevation. In another embodiment, in a two-dimensional space, these two angles may be complementary and so the directions of the sources may be identified by one angle only.

In some embodiments, the lowest dilution of precision may be inside the convex hull 540 of the reference receivers. Within this area the sources lie between the receivers and signals are received from opposite angles. As the sources get further from the convex hull 540, the angles tend to converge into one and the curvature of the signal wavefront may become less evident at the receivers. Therefore, for relatively distant sources, the confidence regions of their location estimates have the shape of ellipsoids that stretch mainly in the radial direction.

In some embodiments, to cope with topologies where sources may be much more spread in space than the receivers, positioning system 500 may rely on the estimation of directions of the sources, while distance estimates are used only if precise enough. In some embodiment, the positioning system may discriminate between three different degrees of angular diversity of the signals that correspond to three different models of the local curvature of the wavefronts in reception: (1) signals arriving from far enough locations may be assumed as infinitely distant, so that the locations are uniquely identified by their directions with respect to the receivers by applying planar wavefront approximation; (2) signals transmitted from relatively close locations outside the convex hull 540 of the reference receivers may have a suitable distance assigned to them by assumption, so that their wavefronts are approximated with a fixed curvature; and (3) signals transmitted from inside the convex hull 540 of the reference receivers, or in the proximity of it, are free from assumptions, because the distances of their locations may be estimated with precision and without approximating their wavefronts.

Figure 6:
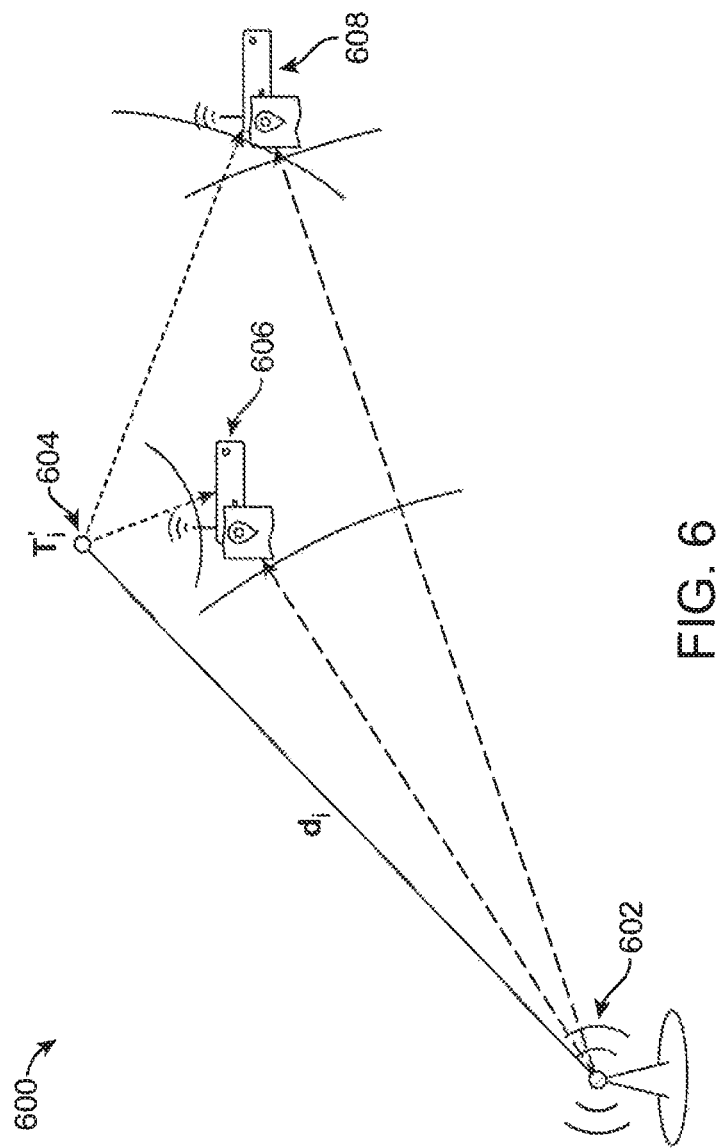
FIG. 6 is a schematic diagram illustrating a positioning system including an apparent signal source, consistent with some embodiments of the present disclosure.

FIG. 6 is a schematic diagram illustrating a positioning system including an apparent signal source, consistent with some embodiments of the present disclosure. As shown in FIG. 6, a positioning system comprises a signal source 602 that transmits signals which may be received by multiple reference receivers (references 606 and 608). The signals may also arrive at the surface of an apparent (a virtual) source 604. In an embodiment, apparent source 604 may be any object that reflects the incident signals so that the reflected signals are received by references 606 and 608 (as shown by the dotted arrows from apparent source 604 to references 606 and 608). In this embodiment, the reflection source is synchronized with source 602 with a certain time offset. The value of the time offset is unknown and needs to be estimated. In another embodiment, apparent source 604 may be any object that scatters the incident signals so that the scattered signals are received by references 606 and 608 (as shown by the dotted arrows from apparent source 604 to references 606 and 608). In this embodiment, the scattering source is also synchronized with source 602 with a certain time offset. The value of the time offset is unknown and needs to be estimated.

In some embodiments, the directions of the apparent signals and distance from which signals seem to arrive may not coincide with the physical location of source 602, due to non-line-of-sight and multipath propagations. For example, if the direct path in the line-of-sight is blocked, reflection phenomena could lead to the localization of elements of the propagation environment which scatter the signals travelling to receivers. If the signal scattering over the indirect path is spatially consistent throughout the positioning area, the element causing it may be regarded as an apparent source of signal. As a result, sources of signals of opportunity are strictly related to transmitters but they are not tied to their actual locations.

By utilizing the apparent sources, the method of positioning can be performed freely anywhere, even under difficult propagation conditions (e.g., indoors), as the receivers may capture reflected or scattered signals for the positioning.

Figure 7:
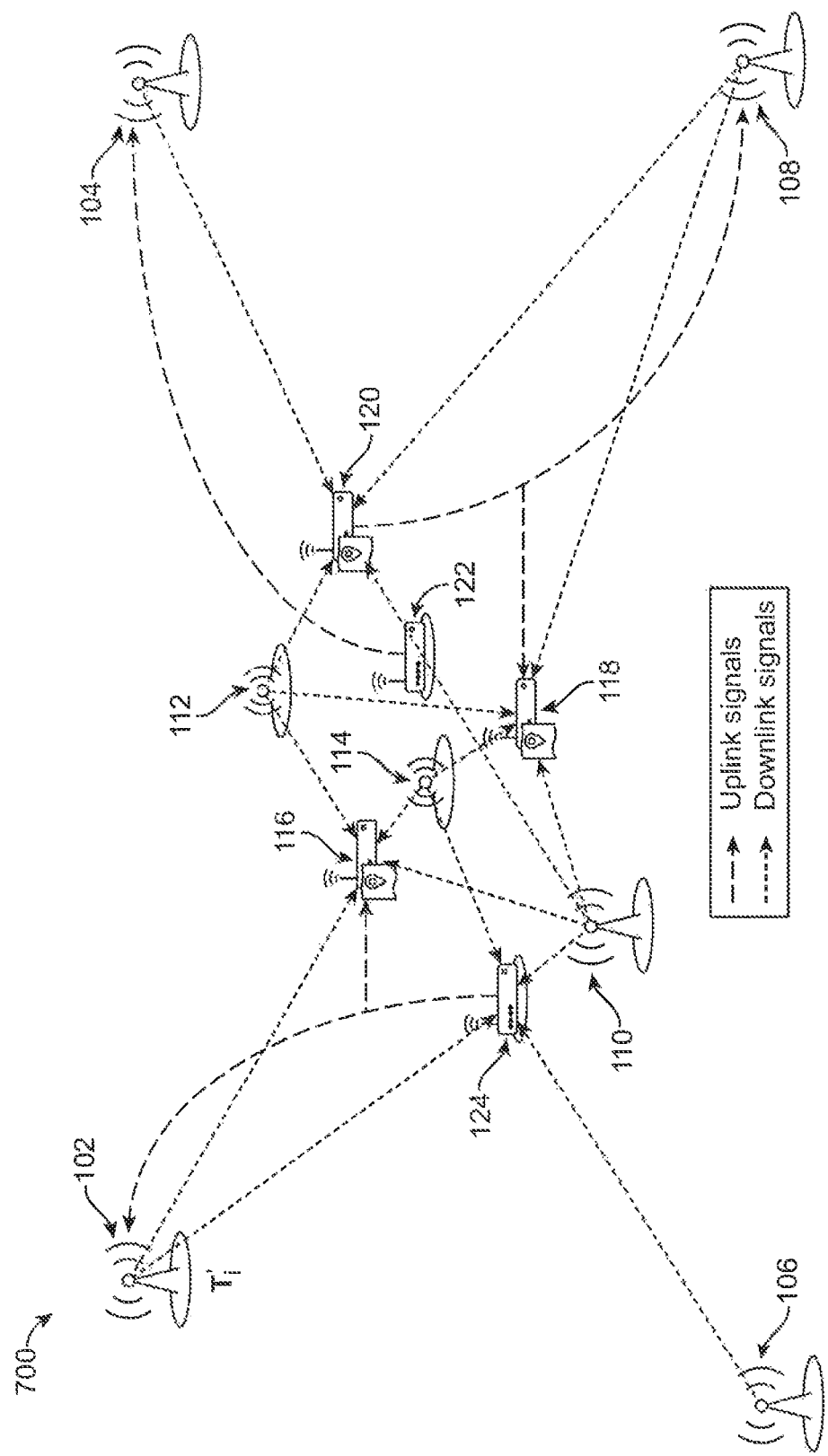
FIG. 7 is a schematic diagram illustrating a positioning system that utilizes uplink and downlink signals, consistent with some embodiments of the present disclosure.

FIG. 7 is a schematic diagram illustrating a positioning system that utilizes uplink signals and downlink signals, consistent with some embodiments of the present disclosure. Referring to FIG. 7, a positioning system 700 may include all the signal transmissions from unknown signal sources to the receivers, that is, downlink signal transmissions, as shown in FIG. 1. For the sake of simplicity, the descriptions of the utilization of downlink signals are omitted here. Compared with FIG. 1, positioning system 700 of FIG. 7 further includes uplink signals, thereby taking advantage of two-way transmissions, in which a receiver can also play the role of a transmitter. For example, in FIG. 7, reference 120 receives downlink signals from the sources 104, 108, 110, and 112, and at the same time, also transmits uplink signals which is intercepted by reference 118. This two-fold role is possible for devices that actively communicate with the transmitters for purposes other than positioning. In some embodiments, positioning using the uplink signals may be optional.

Utilizing uplink channels may enrich the geospatial topology of the signal sources and the content of ranging information of the signals of opportunity used by the positioning system, thereby enhancing the number, quality, coverage, and geometrical dilution of precision of observables, leading to enhanced accuracy of the estimation of the target positions.

Figure 8:
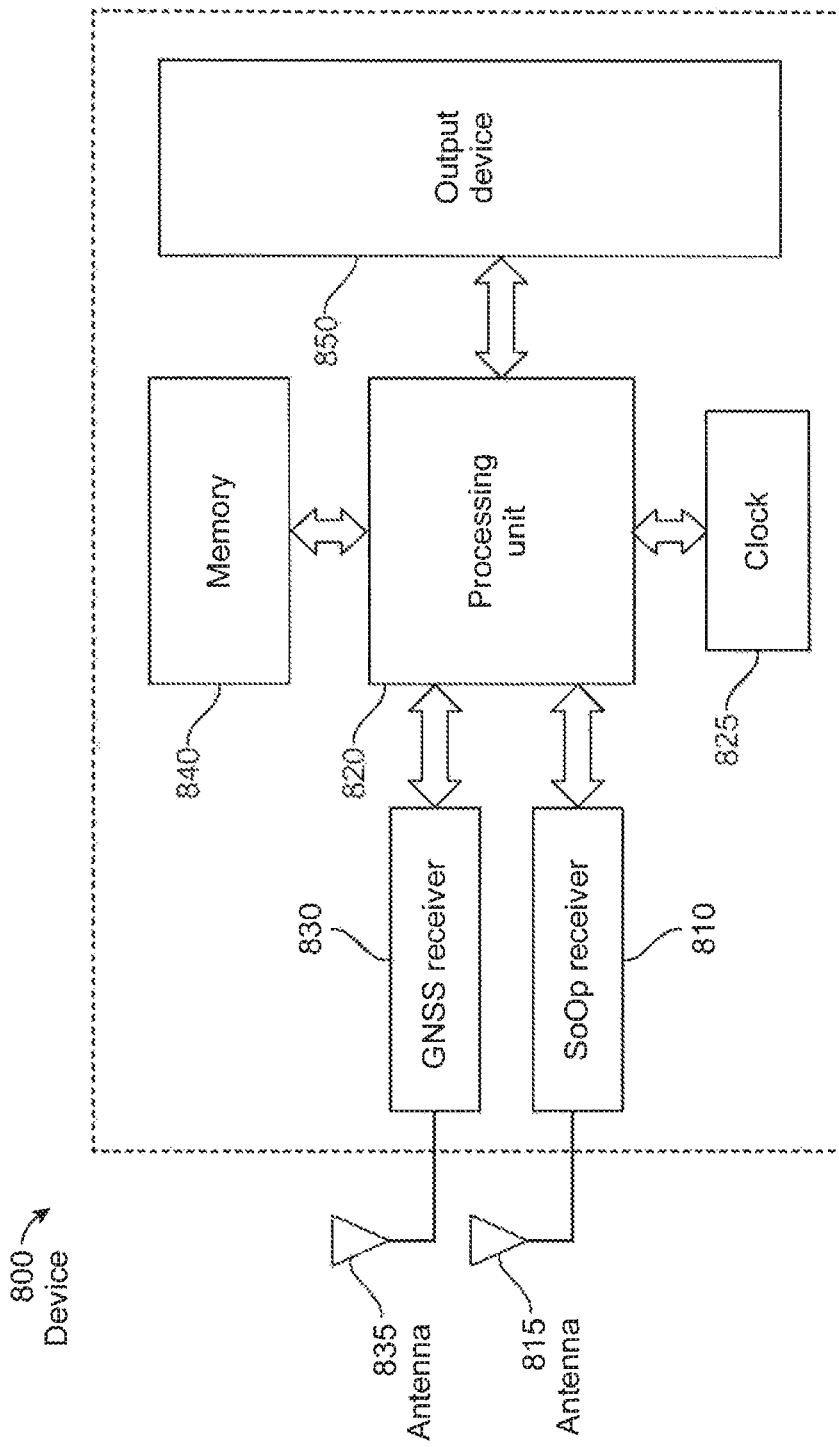
FIG. 8 is a block diagram of a device configured to determine its position or a position of other devices, consistent with some embodiments of the present disclosure.

FIG. 8 is a block diagram of an exemplary device configured to determine its position or positions of other devices, consistent with some embodiments of the present disclosure. Referring to FIG. 8, a device 800 may take any form, including but not limited to, a laptop, a Global Positioning System (GPS), a wireless terminal including a mobile phone, a wireless handheld, or wireless personal device, or any other forms. Device 800 may include a SoOp receiver 810, an antenna 815 coupled with SoOp receiver 810, a GNSS receiver 830, an antenna 835 coupled with GNSS receiver 830, a processing unit 820, a memory 840, a clock 825, and an output device 850. In an embodiment, device 800 may not include GNSS receiver 830 and antenna 835.

SoOp receiver 810, coupled with antenna 815, may be configured to receive signals of opportunity. In an embodiment, SoOp receiver 810 may be part of a transceiver modem which includes a transmitter configured to transmit data to an external device. GNSS receiver 830, coupled with antenna 835, may be configured to receive satellite positioning signals. In an embodiment, GNSS receiver 830 may be part of a transceiver modem which includes a transmitter configured to transmit data to an external device. Local clock 825 may be configured to provide a time of a local place at which device 800 is disposed.

In some embodiments, when GNSS receiver 830 receives satellite positioning signals sufficient to identify the position of device 800, device 800 may function as a reference receiver in a positioning system, such as references 116, 118, and 120 of FIG. 1, to determine an unknown position of another device. For example, device 800 may identify its position through GNSS receiver 830, and obtain times of arrival of the signals of opportunity through SoOp receiver 810. Device 800 may further perform at least a portion of computation for determination of the position of another device. Alternatively, device 800 may send its position and the time of arrival of the signals information to an external device for computation at the external device.

In some embodiments, when GNSS receiver 830 does not receive satellite positioning signals or receives satellite positioning signals insufficient to identify the position of device 800, device 800 may function as a target receiver in a positioning system, such as targets 122 and 124 of FIG. 1, to obtain information for determination of its own position. For example, device 800 may obtain times of arrival of the signals of opportunity through SoOp receiver 810. Device 800 may further perform at least a portion of computation for determination of its own position using the time of arrival of the signals and information (e.g., reference positions and times of arrival of the signals) received from other reference receivers. Alternatively, device 800 may send the time of arrival of the signals data to an external device for computation at the external device. The identified position information may be used in a positioning system in the neighborhood of device 800 in which device 800 may be used as a reference receiver.

Processing unit 820 may include one or more dedicated processing units, application-specific integrated circuits (ASICs), field-programmable gate arrays (FPGAs), or various other types of processors or processing units. Processing unit 820 may be configured to perform at least a portion of computation for a determination of a position of device 800 or a position of another device.

Memory 840 may be any type of computer-readable storage medium including volatile or non-volatile memory devices, or a combination thereof. Memory 840 may be configured to store information related to identities and positions of device 800. Memory 840 may also store computer-readable program instructions and mathematical models that are used in solving the equations (e.g., Equations 1-7) for determination of a position of a device. The computer-readable program instructions may cause processing unit 820 or any other processors to carry out the computations and necessary operations to determine a position of a device. Memory 840 may also store information related to signals received by SoOp receiver 810 and GNSS receiver 830. Memory 840 may also store local wave propagation models for one or more geographic areas. The local wave propagation model may comprise, but is not limited to, directions of signals of opportunity and wavefront approximation of the signals. Storing the models in the memory may allow them to be reused, such that the models do not need to be obtained or calculated each time a position fix is required, thus reducing computational burden and power consumption in device 800.

Output device 850 may be used to report position information to a user or another device. Output device 850 may comprise a user interface including a display and an input device to transmit a user command to processing unit 820. The display may be configured to display a status of signal reception at device 800, the data stored at memory 840, and a status of computation, etc. The display may include, but is not limited to, cathode ray tube (CRT), liquid crystal display (LCD), light-emitting diode (LED), gas plasma, a touch screen, or other image projection devices for displaying information to a user. The input device may be any type of computer hardware equipment used to provide data and control signals from a user. The input device may include, but is not limited to, a keyboard, a mouse, a scanner, a digital camera, a joystick, a trackball, cursor direction keys, a touchscreen monitor, or audio/video commanders, etc. Output device 850 may further comprise a machine interface, such as an electrical bus connection or a wireless communications link.

Figure 9:
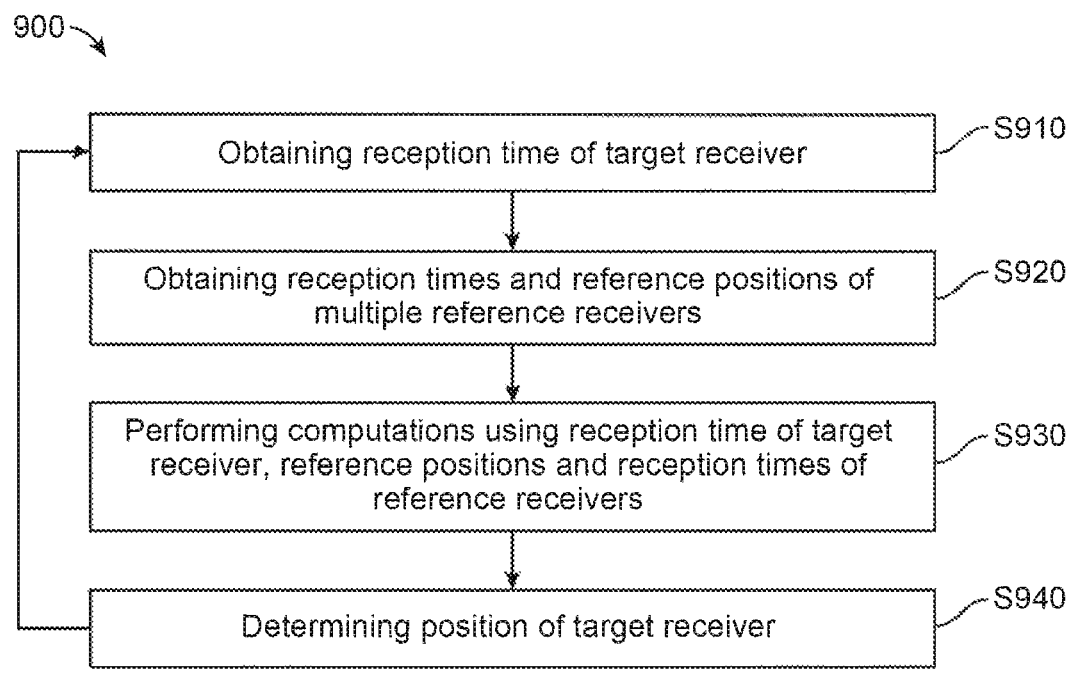
FIG. 9 is a flow chart illustrating an exemplary method of determining a position of a device, consistent with some embodiments of the present disclosure.

FIG. 9 is a flow chart illustrating an exemplary method of determining a position of a device, consistent with some embodiments of the present disclosure. The method may be performed to determine an unknown position of a device, such as device 800 of FIG. 8, which functions as a target receiver in a positioning system, such system 100 of FIG. 1. Referring to FIG. 9, a method 900 may include a step S910 of obtaining time of arrival of the signals at a target receiver. For example, device 800 may receive signals of opportunity at unknown times from multiple signal sources disposed at unknown positions, through SoOp receiver 810 and antenna 815. Device 800 may obtain time information that may come in various forms, such as a time-stamped waveform, a channel impulse response following correlation against the expected signal, a set of measured path arrival times with their signal levels, or a time of arrival estimate. Device 800 may further process the time information to extract times of arrival of the signals. Device 800 may transmit the times of arrival of the signals to an external device for computation. Alternatively, device 800 may perform at least a portion of the computation.

Method 900 may include a step 920 of obtaining times of arrival of the signals and reference positions of multiple reference receivers, such as references 116, 118, and 120 of FIG. 1. References 116, 118, and 120 may have components similar to that of device 800 of FIG. 8. For example, each of references 116, 118, and 120 may identify its own position through satellite signals received by a GNSS receiver and provide the position as a reference position. Alternatively, each of references 116, 118, and 120 may obtain its own position through a previous positioning process in which references 116, 118, and 120 may be target receivers. Each of references 116, 118, and 120 may also obtain times of arrival of the signals at the reference receivers. The reference positions and the times of arrival of the signals at the reference receivers may be transmitted to the external device for computation of the target receiver. Alternatively, each of references 116, 118, and 120 may perform at least a portion of the computation.

Method 900 may include a step 930 of performing computation using the times of arrival of the signals at the target receivers, the reference positions, and the times of arrival of the signals at reference receivers. The computation may be performed entirely by a single device whose position needs to be determined. Alternatively, the computation may be shared by multiple devices in the positioning system. Alternatively, the computation may be entirely performed by an external device.

Method 900 may include a step 940 of determining, a position of a target receiver, and feeding the information of the target receiver for another positioning process. For example, once the position of device 800 is determined by the computation in step 930, the position information of device 800 may be provided as feedback so that device 800 may be used as a reference receiver in another positioning process upon obtaining a time of arrival of the signals at device 800. Device 800 may also be used as a reference receiver in another positioning system neighboring to device 800.

The computer-readable storage medium of the present disclosure may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowchart and block diagrams in the figures illustrate examples of the architecture, functionality, and operation of possible implementations of systems, methods, and devices according to various embodiments. It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value or range.

The use of figure numbers or figure reference labels, if any, in the claims is intended to identify one or more possible embodiments of the claimed subject matter to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A method for determining positions of one or more target receivers, wherein the one or more target receivers and one or more reference receivers are configured to receive a plurality of signals transmitted at unknown times from a plurality of sources that are located at unknown positions and not synchronized with each other, the method comprising:

obtaining times of arrival of the plurality of signals at the one or more target receivers at which each of the one or more target receivers receives at least a portion of a signal transmitted from each of the plurality of sources;

obtaining, from the one or more reference receivers, a plurality of times of arrival of the plurality of signals at the one or more reference receivers associated with when the one or more reference receivers receive a corresponding portion of the plurality of signals as measured according to local clocks of the one or more reference receivers, wherein the one or more reference receivers are located at a plurality of known reference positions and not synchronized with each other or with the plurality of sources; and determining the positions of the one or more target receivers by computing, based on the plurality of times of arrival at the respective one or more reference receivers, the plurality of reference positions, and the times of arrival at the one or more target receivers.

2. The method of claim 1, wherein determining the positions of the one or more target receivers further comprises:

constructing a plurality of equations in which the plurality of times of arrival of the plurality of signals at the respective one or more reference receivers, the plurality of reference positions, and the times of arrival of the plurality of signals at the one or more target receivers are known variables; and determining the positions of the one or more target receivers by solving the plurality of equations.

3. The method of claim 1, wherein determining the positions of the one or more target receivers further comprises:

constructing a first set of equations in which times of arrival of the plurality of signals at a first group of reference receivers among the one or more reference receivers and reference positions of the first group of reference receivers are known variables;

determining directions from which the plurality of signals is incident by solving the first set of equations;

constructing a second set of equations in which the times of arrival of the plurality of signals at the one or more target receivers, the directions of the plurality of signals, and times of arrival of the plurality of signals at a second group of reference receivers among the one or more reference receivers are known variables; and
determining the positions of the one or more target receivers by solving the second set of equations.

4. The method of claim 3, wherein the first group of reference receivers are the same as or different from the second group of reference receivers.

5. The method of claim 3, further comprising:
inputting the determined positions of the one or more target receivers as additional reference positions so that the one or more target receivers can be used as reference receivers in another determination.

6. The method of claim 1, wherein determining the positions of the one or more target receivers further comprises:
sending the times of arrival of the plurality of signals at the one or more target receivers, the plurality of times of arrival of the plurality of signals at the respective one or more reference receivers, and the plurality of reference positions to a positioning engine; and
receiving position information of the one or more target receivers determined by the positioning engine.

7. The method of claim 1, wherein determining the positions of the one or more target receivers further comprises:
performing, by at least one of the plurality of reference receivers and at least one of the one or more target receivers, a portion of the computing; and
communicating computation results between the one or more reference receivers and the one or more target receivers to determine the positions of the one or more target receivers.

8. The method of claim 2, wherein the plurality of equations is constructed based on signals repeatedly transmitted from a transmitter at different points of time.

9. The method of claim 1, further comprising:
approximating one or more signal propagation wavefronts in neighborhoods of the one or more target receivers and the one or more reference receivers using a curve or a straight line,
wherein an orientation of the curve or the straight line is related to a direction of each of the plurality of signals from the plurality of sources, and
wherein a curvature of the curve or the straight line is used in determining the positions of the one or more target receivers.

10. The method of claim 1, wherein the plurality of sources comprises one or more transmitters of one or more wireless networks.

11. The method of claim 1, wherein the plurality of sources comprises one or more virtual sources arising from objects that reflect the plurality of signals transmitted from the plurality of sources.

12. The method of claim 1, wherein the plurality of sources comprises one or more virtual sources arising from objects that scatter the plurality of signals transmitted from the plurality of sources.

13. The method of claim 1, wherein the plurality of signals received by the one or more reference receivers comprise downlink signals transmitted from the plurality of sources.

14. The method of claim 13, wherein the plurality of signals received by the one or more reference receivers further comprises at least one uplink signal transmitted from the one or more target receivers or the one or more reference receivers.

15. The method of claim 1, wherein the plurality of sources are not synchronized with each other, when:
relative times of the plurality of sources are not known; or
relative times of the plurality of sources are known with a magnitude of an accuracy error greater than 3.3 nanosecond.

16. A device configured to determine its position or positions of other devices, the device comprising:
a receiver configured to:
receive a plurality of signals transmitted at unknown times from a plurality of sources that are located at unknown positions and not synchronized with each other; and
obtain a time of arrival of the plurality of signals at the receiver at which the receiver receives at least a portion of a signal transmitted from each of the plurality of sources;
a processor configured to:
determine the position of the device by performing a computation based on the time of arrival of the plurality of signals at the receiver, a plurality of times of arrival of the plurality of signals at one or more reference receivers, and a plurality of reference positions of the one or more reference receivers,
wherein the plurality of times of arrival of the plurality of signals at the one or more reference receivers are times at which the one or more reference receivers receives a corresponding portion of the plurality of signals as measured according to local clocks of the one or more reference receivers, and the one or more reference receivers are located at known positions and not synchronized with each other or with the plurality of sources.

17. The device of claim 16, wherein the receiver is a first receiver, the plurality of signals are first signals, and the device further comprises:
a second receiver configured to receive a second signal from a satellite system.

18. The device of claim 17, wherein the device is configured to be used as a reference receiver in a positioning system when:
the second signal received from the satellite system determines the position of the device; or
the position of the device is determined by the computation.

19. The device of claim 16, wherein the receiver is a portion of a transceiver modem configured to transmit the time of arrival of the plurality of signals at the receiver to an external device.

20. An apparatus configured to determine one or more unknown positions of one or more target devices, the apparatus comprising:
at least one first communication interface configured to:
receive, from the one or more target devices, times of arrival of a plurality of signals associated with when the one or more target devices receive a corresponding portion of the plurality of signals transmitted at unknown times from a plurality of sources that are located at unknown positions and not synchronized with each other; and
receive, from one or more reference devices, one or more reference positions of the one or more reference devices and times of arrival of the plurality of signals associated with when the one or more reference devices receive a corresponding portion of the plurality of signals as measured according to local clocks of the one or more reference devices, wherein the plurality of reference devices are not synchronized with each other or with the plurality of sources; and at least one processor configured to:
determine, the one or more unknown positions of the one or more target devices, by performing a computation based on times of arrival of the plurality of signals at the respective one or more reference devices, the one or more reference positions, and the times of arrival of the plurality of signals at the one or more target devices; and at least one second communication interface configured to:
transmit information regarding the determined one or more positions of the one or more target devices.

21. The apparatus of claim 20, further comprises:
a storage configured to store positioning information including directions of the plurality of signals incident to the one or more target devices and the one or more reference devices,
wherein the apparatus is configured to share the positioning information with an external device.

22. The apparatus of claim 20, wherein the processor is configured to:
determine directions of the plurality of sources with respect to an origin of a coordinate system.

23. A non-transitory computer-readable medium having stored therein instructions that, when executed by a processor, perform a method for determining positions of one or more target receivers, wherein the one or more target receivers and one or more reference receivers are configured to receive a plurality of signals transmitted at unknown times from a plurality of sources that are located at unknown positions and not synchronized with each other, the method comprising:
obtaining times of arrival of the plurality of signals at the one or more target receivers at which each of the one or more target receivers receives at least a portion of a signal transmitted from each of the plurality of sources;
obtaining, from the one or more reference receivers, a plurality of times of arrival of the plurality of signals associated with when the one or more reference receivers receive a corresponding portion of the plurality of signals as measured according to local clocks of the one or more reference receivers, wherein the one or more reference receivers are located at a plurality of known reference positions and not synchronized with each other or with the plurality of sources; and
determining the positions of the one or more target receivers by computing, based on the plurality of times of arrival of the plurality of signals at the respective one or more reference receivers, the plurality of reference positions, and the times of arrival of the plurality of signals at the one or more target receivers.

24. A method for determining directions of a plurality of sources with respect to an origin of a coordinate system, wherein the plurality of sources is not synchronized with each other, and a plurality of signals transmitted at unknown time from the plurality of sources are received by one or more target receivers and one or more reference receivers, the method comprising:
obtaining times of arrival of the plurality of signals at the one or more target receivers at which each of the one or more target receivers receives at least a portion of a signal transmitted from each of the plurality of sources, wherein the one or more target receivers are located at unknown positions;
obtaining, from the one or more reference receivers, a plurality of times of arrival of the plurality of signals associated with when the one or more reference receivers receive a corresponding portion of the plurality of signals as measured according to local clocks of the one or more reference receivers, wherein the one or more reference receivers are located at known reference positions and not synchronized with each other or with the plurality of sources; and
determining the directions of the plurality of sources by computing, based on the plurality of times of arrival of the plurality of signals at the respective one or more reference receivers, the plurality of reference positions, and the times of arrival of the plurality of signals at the one or more target receivers.

25. The method of claim 24, wherein determining the directions of the plurality of sources with respect to the origin of the coordinate system further comprises:
constructing a plurality of equations in which the plurality of times of arrival of the plurality of signals at the respective one or more reference receivers, the plurality of reference positions, and the times of arrival of the plurality of signals at the one or more target receivers are known variables; and
determining the directions of the one or more sources by solving the plurality of equations.

26. The method of claim 24, wherein determining the directions of the plurality of sources with respect to the origin of the coordinate system further comprises:
determining distances between the plurality of sources and the one or more target receivers.

27. The method of claim 26, wherein determining the distances between the plurality of sources and the one or more target receivers comprises:
approximating signal propagation wavefronts in neighborhoods of the one or more target receivers and the one or more reference receivers using a curve or a straight line; and
determining curvatures of approximated signal propagation wavefronts.

* * * * *